US009569922B1

(12) United States Patent
Johnson et al.

(10) Patent No.: US 9,569,922 B1
(45) Date of Patent: Feb. 14, 2017

(54) SYSTEM AND METHODS RELATED TO SPORTS LEAGUES

(71) Applicant: TEASER FEVER, LLC, Bloomfield Hills, MI (US)

(72) Inventors: Jeffrey Michael Johnson, Birmingham, MI (US); Christopher James Karchon, Bloomfield Hills, MI (US)

(73) Assignee: TEASER FEVER, LLC, Bloomfield Hills, MI (US)

(*) Notice: Subject to any disclaimer, the term of this patent is extended or adjusted under 35 U.S.C. 154(b) by 0 days.

(21) Appl. No.: 14/845,054

(22) Filed: Sep. 3, 2015

(51) Int. Cl.

| | |
|---|---|
| ***A63F 13/00*** | (2014.01) |
| ***A63F 9/24*** | (2006.01) |
| ***G07F 17/32*** | (2006.01) |

(52) U.S. Cl.
CPC ......... *G07F 17/3227* (2013.01); *G07F 17/323* (2013.01); *G07F 17/3267* (2013.01); *G07F 17/3269* (2013.01); *G07F 17/3288* (2013.01)

(58) Field of Classification Search
CPC ..... G07F 17/32; G07F 17/3288; A63F 13/828
See application file for complete search history.

(56) References Cited

U.S. PATENT DOCUMENTS

| | | | | | |
|---|---|---|---|---|---|
| 6,126,543 | A * | 10/2000 | Friedman | ................ G07F 17/32 | 273/139 |
| 2006/0025208 | A1* | 2/2006 | Ramsey | ................ A63F 3/0615 | 463/25 |
| 2011/0053681 | A1* | 3/2011 | Goldman | ............ G07F 17/3274 | 463/25 |
| 2015/0352449 | A1* | 12/2015 | Nangia | ................. A63F 13/828 | 463/31 |

OTHER PUBLICATIONS

Anonymous, "Spread Betting", Wikipedia, Dec. 1, 2008, retrieved from Internet URL via waybackmachine from <https://en.wikipedia.org/wiki/Spread_betting>.*

Staff, "What are Knockout Tournaments?", Apr. 14, 2010, Part Time Poker retrieved from Internet URL <http://www.parttimepoker.com/what-are-knockout-tournaments>.*

* cited by examiner

*Primary Examiner* — Jason Skaarup
*Assistant Examiner* — Ryan Hsu
(74) *Attorney, Agent, or Firm* — Howard & Howard Attorneys PLLC

(57) ABSTRACT

Systems and methods for providing a game related to fantasy sports is described herein where a database includes information associated with live sporting events, a user module receives information associated with the live sporting events, a gaming server communicatively coupled to the database and the computing device is configured to display a list of the live sporting events, receive selections from teams of event outcomes, receive event outcome information from the database, display event outcome information on the user module, and determine whether the team is a winning team or a losing team. Winning teams are awarded points based on the number of losing teams and a predetermined multiplier. Losing teams are deduced points based on the number of winning teams and a predetermined multiplier. Adjusted spreads associated with the live sporting events may be calculated and applied to confer a competitive advantage to the teams.

30 Claims, 18 Drawing Sheets

500 502 504

| Week's Lines | | | | | | |
|---|---|---|---|---|---|---|
| HOME TEAMS IN ALL CAPS | | | | | | |
| **Favorite** | **Spread** | **Adjusted Spread** | **vs.** | **Underdog** | **Spread** | **Adjusted Spread** |
| NEW ORLEANS | -3 | **11** | vs. | Atlanta | 3 | **17** |
| INDIANAPOLIS | -9 | **4** | vs. | Oakland | 3 | **17** |
| CLEVELAND | 0 | **14** | vs. | Miami | 0 | **14** |
| DETROIT | -4.5 | **9.5** | vs. | Minnesota | 4.5 | **18.5** |
| New England | 10.5 | **3.5** | vs. | BUFFALO | 10.5 | **24.5** |
| NY JETS | -3 | **11** | vs. | Tampa Bay | 3 | **17** |
| Kansas City | -3.5 | **10.5** | vs. | JACKSONVILLE | 3.5 | **17.5** |
| Seattle | -3.5 | **10.5** | vs. | CAROLINA | 3.5 | **17.5** |
| CHICAGO | -3.5 | **10.5** | vs. | Tennessee | 3.5 | **17.5** |
| PITTSBURGH | -7.5 | **6.5** | vs. | Tennessee | 7.5 | **21.5** |
| SAN FRANCISCO | -4.5 | **9.5** | vs. | Green Bay | 4.5 | **18.5** |
| ST. LOUIS | -5 | **9** | vs. | Arizona | 5 | **19** |
| DALLAS | -3.5 | **10.5** | vs. | NY Giants | 3.5 | **17.5** |
| WASHINGTON | -3.5 | **10.5** | vs. | Philadelphia | 3.5 | **17.5** |
| Houston | -3.5 | **10.5** | vs. | SAN DIEGO | 3.5 | **17.5** |

FIGURE 5A

508

506

| Week 1 Picks | | | | |
|---|---|---|---|---|
| **TEAM** | **1** | **2** | **3** | **4** |
| A | SEA | INDY | CLEV | CHI |
| B | TB | KC | DET | SEA |
| C | ATL | SF | TB | NE |
| D | DET | TB | KC | INDY |
| E | INDY | CINCI | TB | SF |
| F | INDY | CINCI | SEA | MINN |
| G | CINCI | HOUS | NE | INDY |
| H | INDY | CLEV | NE | CHI |
| I | ATL | CHI | TB | INDY |
| J | NE | TB | CINCI | NYG |
| K | HOUS | WASH | NE | TB |
| L | INDY | NE | HOUS | NO |
| M | NE | INDY | PITT | SF |
| N | NE | INDY | SF | WASH |
| O | INDY | TB | KC | SF |
| P | ATL | CHI | GB | SF |
| Q | INDY | CLEV | TB | SEA |
| R | NO | TB | HOUS | SF |
| S | INDY | NE | SEA | HOUS |
| T | CINCI | INDY | STL | CLEV |
| U | INDY | SEA | PITT | NE |
| V | ATL | TB | CINCI | CLEV |
| W | CINCI | TB | NE | INDY |
| X | CINCI | TB | NE | INDY |
| Y | ATL | TB | INDY | SF |
| Z | INDY | NE | KC | HOUS |
| AB | INDY | TB | KC | ARIZ |
| AC | ATL | INDY | SEA | GB |
| AD | HOUS | INDY | SF | WASH |

FIGURE 5B

510

| Week 1 Results | | | | | |
|---|---|---|---|---|---|
| TEAM | 1 | 2 | 3 | 4 | Final Result |
| A | SEA | INDY | CLEV | CHI | WINNER |
| B | TB | KC | DET | SEA | Double Loser |
| C | ATL | SF | TB | NE | Loser |
| D | DET | TB | KC | INDY | Double Loser |
| E | INDY | CINCI | TB | SF | Loser |
| F | INDY | CINCI | SEA | MINN | WINNER |
| G | CINCI | HOUS | NE | INDY | WINNER |
| H | INDY | CLEV | NE | CHI | WINNER |
| I | ATL | CHI | TB | INDY | Loser |
| J | NE | TB | CINCI | NYG | Loser |
| K | HOUS | WASH | NE | TB | Loser |
| L | INDY | NE | HOUS | NO | WINNER |
| M | NE | INDY | PITT | SF | WINNER |
| N | NE | INDY | SF | WASH | WINNER |
| O | INDY | TB | KC | SF | Double Loser |
| P | ATL | CHI | GB | SF | WINNER |
| Q | INDY | CLEV | TB | SEA | Loser |
| R | NO | TB | HOUS | SF | Loser |
| S | INDY | NE | SEA | HOUS | WINNER |
| T | CINCI | INDY | STL | CLEV | WINNER |
| U | INDY | SEA | PITT | NE | WINNER |
| V | ATL | TB | CINCI | CLEV | Loser |
| W | CINCI | TB | NE | INDY | Loser |
| X | CINCI | TB | NE | INDY | Loser |
| Y | ATL | TB | INDY | SF | Loser |
| Z | INDY | NE | KC | HOUS | Loser |
| AB | INDY | TB | KC | ARIZ | Triple Loser |
| AC | ATL | INDY | SEA | GB | WINNER |
| AD | HOUS | INDY | SF | WASH | WINNER |

512
516
514
518

FIGURE 5C 520 522 524

| TEAM | Week #1 Payout | Standings After Week #1 |
|---|---|---|
| A | 160 | 140 |
| B | -130 | -150 |
| C | -130 | -150 |
| D | -130 | -150 |
| E | -130 | -150 |
| F | 160 | 140 |
| G | 160 | 140 |
| H | 160 | 140 |
| I | -130 | -150 |
| J | -130 | -150 |
| K | -130 | -150 |
| L | 160 | 140 |
| M | 160 | 140 |
| N | 160 | 140 |
| O | -130 | -150 |
| P | 160 | 140 |
| Q | -130 | -150 |
| R | -130 | -150 |
| S | 160 | 140 |
| T | 160 | 140 |
| U | 160 | 140 |
| V | -130 | -150 |
| W | -130 | -150 |
| X | -130 | -150 |
| Y | -130 | -150 |
| Z | -130 | -150 |
| AB | -130 | -150 |
| AC | 160 | 140 |
| AD | 160 | 140 |

FIGURE 5D 614 600 608 610 612 616 618 602

| Pick 1 DEN | DEN | vs. | DET |
|---|---|---|---|
| Professional Final Score | 21 | | 14 |
| Spread | -3 | | 3 |
| Add FourPlay Points | 14 | | 14 |
| | 11 | | 17 |
| Add Points | 32 | | 31 |
| Subtract Opponent's Score | -14 | | -21 |
| FP Points | 18 | | 10 |

| Pick 2 CHI | STL | vs. | CHI |
|---|---|---|---|
| Professional Final Score | 35 | | 17 |
| Spread | -7 | | 7 |
| Add FourPlay Points | 14 | | 14 |
| | 7 | | 21 |
| Add Points | 42 | | 38 |
| Subtract Opponent's Score | -17 | | -35 |
| FP Points | 25 | | 3 |

604

| Pick 3 IND | IND | vs. | MIA |
|---|---|---|---|
| Professional Final Score | 10 | | 14 |
| Spread | -8.5 | | 8.5 |
| Add FourPlay Points | 14 | | 14 |
| | 5.5 | | 22.5 |
| Add Points | 15.5 | | 36.5 |
| Subtract Opponent's Score | -14 | | -10 |
| FP Points | 1.5 | | 26.5 |

606

| Pick 4 WAS | WAS | vs. | TB |
|---|---|---|---|
| Professional Final Score | 21 | | 10 |
| Spread | -6.5 | | 6.5 |
| Add FourPlay Points | 14 | | 14 |
| | 7.5 | | 20.5 |
| Add Points | 28.5 | | 30.5 |
| Subtract Opponent's Score | -10 | | -21 |
| FP Points | 18.5 | | 9.5 |

| | FP Points |
|---|---|
| Pick 1: DEN | 18 |
| Pick 2: CHI | 3 |
| Pick 3: IND | 1.5 |
| Pick 4: WAS | 18.5 |
| Total | 41 |

620

FIGURE 6

| **Color Score Formula Below** | PHI (+9.5) | vs. | TBD (-8) |
|---|---|---|---|
| Team Score | 20 | | 3 |
| Plus or Minus Spread | 9.5 | | -8 |
| Minus Opponents Score | -3 | | -20 |
| Plus FourPlay Spread +14 | 14 | | 14 |
| **Color Score Total** | 40 | | -11 |

| Color Score Key | |
|---|---|
| Any Negative Number | Red |
| 0 | |
| 1 | Orange |
| 2 | |
| 3 | |
| 4 | Yellow |
| 5 | |
| 6 | |
| 7 | |
| 8 | Light Green |
| 9 | |
| 10 | |
| 11 | |
| 12 | |
| 13 | |
| 14 | |
| 14 or Greater | Green |

FIGURE 7

1000

1010

1020

| PLAYOFF GAMES<br>PICK ANY "3" (± 10 POINTS) | | | |
|---|---|---|---|
| 1 | INDIANAPOLIS | Kansas City | INDY -2½ |
| 2 | PHILADELPHIA | New Orleans | PHIL -2½ |
| 3 | CINCINNATI | San Diego | CINCI -7 |
| 4 | San Fran | GREEN BAY | SF -3 |
| 5 | INDIANAPOLIS | Kansas City | o/u 46 |
| 6 | PHILADELPHIA | New Orleans | o/u 53½ |
| 7 | CINCINNATI | San Diego | o/u 47 |
| 8 | San Francisco | GREEN BAY | o/u 48 |

FIGURE 10A 1030 1040 1050

Professional Football Championship

PICK ANY "3" (± 10 POINTS)

| ITEM # | EVENT | POINT SPREAD |
|---|---|---|
| 1 | DEN -2½ | 6 |
| 2 | SEA +2½ | 6 |
| 3 | 1st Half Line DEN -1 | 3 |
| 4 | 1st Half Line SEA +1 | 3 |
| 5 | Total Points in Game "over 47" | 6 |
| 6 | Total Points in Game "under 47" | 6 |
| 7 | 1st Half Total Points "over 23½" | 3 |
| 8 | 1st Half Total Points "under 23½" | 3 |
| 9 | Total Points scored in 1ST Quarter "over 12" | 2 |
| 10 | Total Points scored in 1ST Quarter "under 12" | 2 |
| 11 | Total Points scored in 2ND HALF "over 23½" | 3 |
| 12 | Total Points scored in 2ND HALF "under 23½" | 3 |
| 13 | Total Game Points scored by DEN "over 25" | 3 |
| 14 | Total Game Points scored by SEA "over 22" | 3 |
| 15 | Total Game Points scored by DEN" under 25" | 2 |
| 16 | Total Game Points scored by SEA "under 22" | 2 |

FIGURE 10B

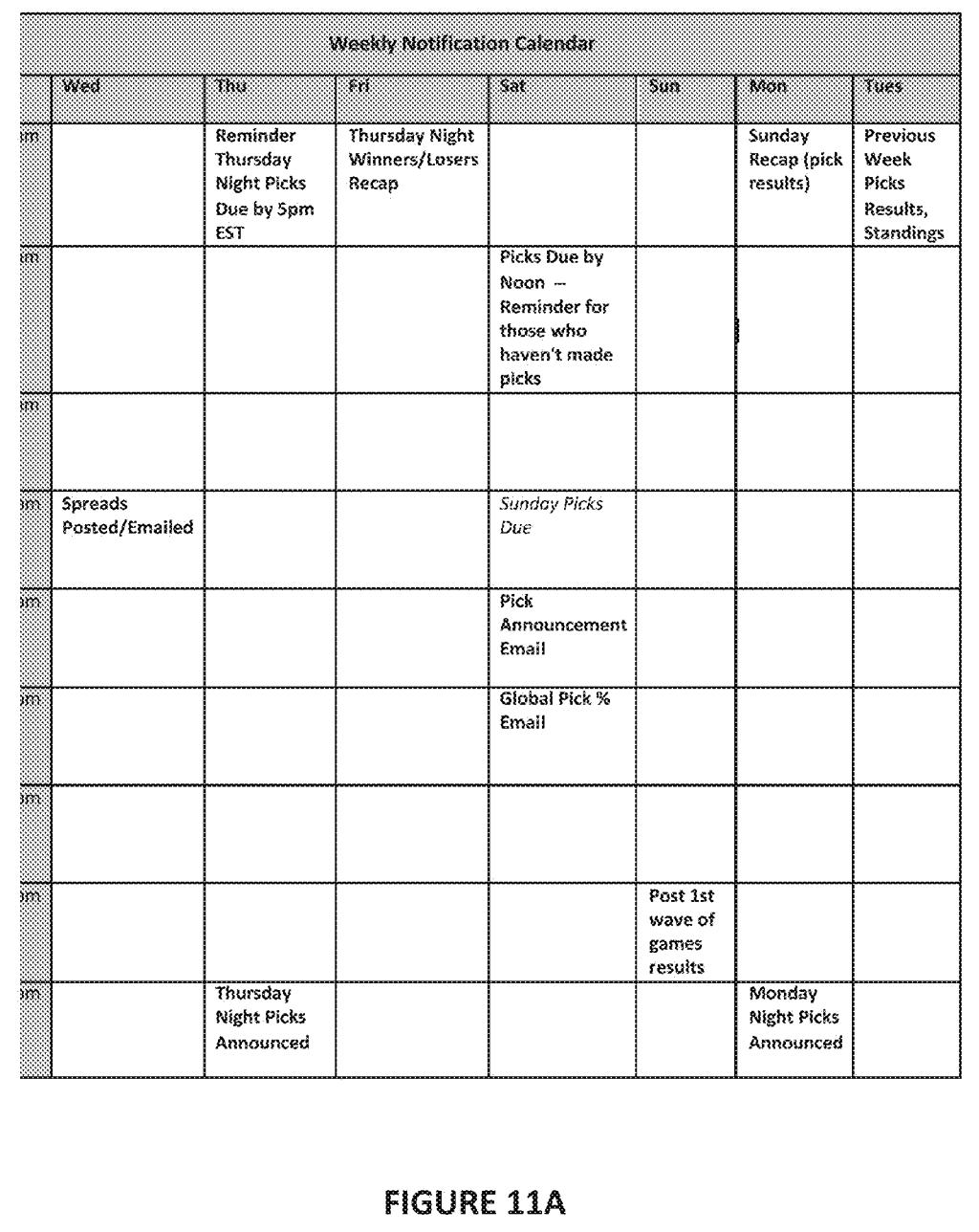

| Weekly Notification Calendar | | | | | | | |
|---|---|---|---|---|---|---|---|
| | Wed | Thu | Fri | Sat | Sun | Mon | Tues |
| m | | Reminder Thursday Night Picks Due by 5pm EST | Thursday Night Winners/Losers Recap | | | Sunday Recap (pick results) | Previous Week Picks Results, Standings |
| m | | | | Picks Due by Noon – Reminder for those who haven't made picks | | | |
| m | | | | | | | |
| m | Spreads Posted/Emailed | | | *Sunday Picks Due* | | | |
| m | | | | Pick Announcement Email | | | |
| m | | | | Global Pick % Email | | | |
| m | | | | | | | |
| m | | | | | Post 1st wave of games results | | |
| m | | Thursday Night Picks Announced | | | | Monday Night Picks Announced | |

FIGURE 11A

| Weekly Notification Calendar | | | | | | | | |
|---|---|---|---|---|---|---|---|---|
| | | Wed | Thu | Fri | Sat | Sun | Mon | Tues |
| 9 | am | | | | | Saturday Recap (Pick Results) | | **Previous Week Picks Results, Standings** |
| 10 | am | | | Selections due by Noon -- Reminder for those who haven't made selections | | | | |
| 11 | am | | | | | | | |
| 12 | pm | **Spreads Posted/ Emailed** | | | *Gameday* | | | |
| 1 | pm | | | Pick Announcement Email | | | | |
| 2 | pm | | | | | | | |
| 3 | pm | | | | | | | |
| 4 | pm | | | | | | | |
| 5 | pm | | Thursday Night Picks Announced | | | | | |

FIGURE 11B

SYSTEM AND METHODS RELATED TO SPORTS LEAGUES

RELATED APPLICATION

The subject patent application claims priority to and all the benefits of U.S. Provisional Patent Application No. 62/045,346, filed on Sep. 3, 2014, the disclosure of which is herein incorporated by reference in its entirety.

BACKGROUND

Field of the Invention

The present invention generally relates to fantasy sports leagues. More specifically, the present invention relates to systems and methods related to fantasy sports leagues.

Description of the Related Art

One way to more actively follow sports is through sports betting. Sports betting has become increasingly popular, especially with the promotion of gaming via the Internet. In sports betting, combining two or more games into a single wager is known as a "parlay" wager. Traditional parlay wagers require that all of the two or more games chosen by the bettor beat the predetermined "spread", which is a range of outcomes rather than a "win or lose" outcome. Because it is more difficult to win a parlay wager rather than an individual wager, the payout for parlay wagers is often higher than the payout for an individual wager.

In traditional sports betting, the spread of a particular sporting event changes as a majority of wagers move to one side over the other. This distributes the wagers to level the playing field for subsequent wagers prior to the start of the sporting event. The payout is based on the odds the bettor received at the time of placing the wager.

For sports enthusiasts who cannot or do not want to engage in traditional sports betting, fantasy sports leagues have emerged as an alternative. Fantasy sports participants select individual players from professional sports leagues to create their own teams. Participants manage these teams throughout the course of an entire season, and participants often join fantasy sports leagues with their friends, family members, and/or colleagues. Participants are awarded points based on the real-life performance of the players on their fantasy teams. Fantasy scoring relies on the performance of only a few all-star athletes at a time. This can be frustrating for participants, as the game does not focus on the teams on the field, but only the individuals on the participant's fantasy team. The management of fantasy teams can be a very long and time-consuming process, as participants must manage their fantasy teams on a weekly basis.

As a result, a system that allows league members the ability to participate in a competition that automatically determines a winner without requiring a large investment of time is desirable. Thus, participants may more actively follow sporting events. Finally, it is desirable for a game that utilizes sports betting concepts in a league-based game.

The present invention is aimed at one or more of the problems identified above.

SUMMARY OF THE INVENTION

The invention generally relates to a game related to fantasy sports leagues using adjusted spreads where the losing teams pay or distribute points to the winning teams.

Some embodiments are directed to a system for providing a game related to fantasy sports where a database includes information associated with live sporting events, a user module receives information associated with the live sporting events, a gaming server communicates with the database and the computing device and displays a list of the live sporting events, receives selections from teams of event outcomes, receives event outcome information from the database, displays event outcome information on the user module, and determines whether the team is a winning team or a losing team. Winning teams are awarded points based on the number of losing teams and a predetermined multiplier. Losing teams are deduced points based on the number of winning teams and a predetermined multiplier.

In some embodiments, a system for providing a game related to fantasy sports is provided where a database includes information associated with live sporting events, a user module receives information associated with the live sporting events, a gaming server communicates with the database and the computing device and displays a list of the live sporting events, receives a predetermined spread adjustment value from a game administrator, retrieves a spread for each of the live sporting events from the database, and applies the spread adjustment value to the spread to produce an adjusted spread for each of the live sporting events.

Some embodiments are directed to a method for providing a game to a user via a computing device that includes storing information associated with live sporting events, receiving information associated with the live sporting events, displaying a list of live sporting events on the computing device, receiving during a certain time period a team's selection of event outcomes, receiving event outcome information, displaying event outcome information on the computing device, determining whether the selected event outcomes occurred during the time period, and determining whether the team is a winning team or a losing team based on the selected event outcomes.

In some embodiments, a method for providing a game related to fantasy sports is provided where a database stores information associated with a live sporting events, information is received associated with the live sporting events, a list of live sporting events is displayed, a predetermined spread adjustment value from is received from a game administrator, a spread for each of the live sporting events is retrieved from the database, and the spread adjustment value is applied to the spread to produce an adjusted spread for each of the live sporting events.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5A illustrates a listing of all gaming events available for a particular week.

FIG. 5B illustrates a listing of the selections of each team in the league, chosen by the team managers from the listing of FIG. 5A.

FIG. 5C illustrates a listing of the results of the selections of each team in the league.

FIG. 5D illustrates a listing of the calculated balances for each team.

FIG. 6 illustrates an adjusted spread calculation and total points calculation for a single team's weekly selections.

FIG. 7 illustrates an exemplary formula for calculating the Sporting Event Dynamic Visual Aid for spreads and adjusted spreads.

FIG. 10A illustrates the gaming events available for selection in an exemplary week of a post-season league.

FIG. 10B illustrates an alternative listing of gaming events available for selection in a week of a post-season league.

FIG. 11A illustrates an exemplary notification schedule for a league that follows a professional sports league.

FIG. 11B illustrates an exemplary notification schedule for a league that follows a collegiate sports league.

DETAILED DESCRIPTION

Persons of ordinary skill in the art will realize that the following description of the present invention is illustrative only and not in any way limiting. Other embodiments of the invention will readily suggest themselves to such skilled persons.

With reference to the drawings and description, the present invention overcomes at least some of the disadvantages of known fantasy sports leagues. The fantasy sports league of the present invention utilizes and aggregates real-world scores and adjusted odds to produce an engaging and challenging social competition.

Game Hardware

Figure 1:
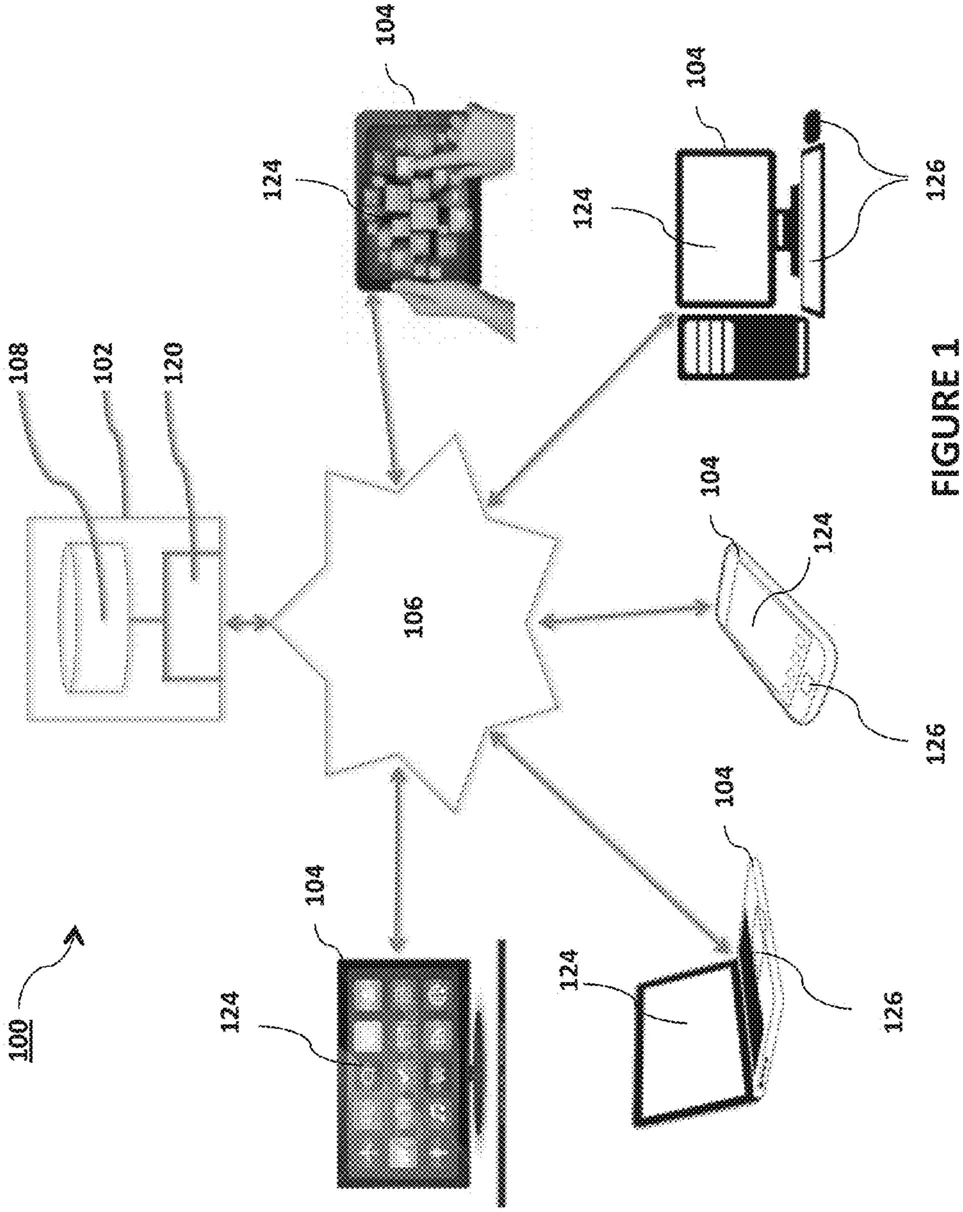
FIG. 1 illustrates typical hardware in a network system environment in accordance with a preferred embodiment and the most preferred embodiment of the present invention.

FIG. 1 depicts a communications network hardware 100 that includes a gaming server 102. Communications network hardware 100 also at least one electronic communications device 104. Electronic communications device 104 may comprise a desktop computer, laptop computer, tablet, smart phone, or any other device capable of electronic communications. Gaming server 102 and electronic communications device 104 are in electronic communication with each other over a communications network 106. Network 106 may be a private communications network or the Internet, and may be hardwired, wireless, or a hybrid thereof. In a preferred embodiment, network 106 constitutes the Internet and connects users to the gaming system's web site. Network 106 may alternatively comprise a private communications network configured as a closed-loop, which may include local area networks (LANs) and dedicated wide area networks (WANs).

Gaming server 102 includes a processor 108 memory device 110 from which gaming information and other relevant data is accessible to electronic communications device 104. Memory device 110 includes a computer-readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables processor 108 to store, retrieve, and/or execute instructions and/or data.

Gaming server 102 may include one or more internal data storage devices, e.g. a hard drive (not shown), for storing content for communication to electronic communications device 104. Gaming server 102 is connected to an external data storage device 112, from which gaming server 102 obtains information concerning sporting events for communication to electronic communications device 104. Server computer 102 is controlled by software to provide content to electronic communications device 104.

Gaming server 102 accesses information on future sporting events from external data storage device 112 and information on the outcome of the sporting events from this device or from a sports wire service. It will be understood by those skilled in the art that this process involves communication through routers and other network components in addition to suitable servers, as is dictated by the particular network environment.

Electronic communications device 104 includes a display device 114 for providing a display, such as, for example and without limitation, a cathode ray tube (CRT) display, light-emitting-diode (LED) display, liquid-crystal-diode (LCD) display, plasma display, or tactile display. Electronic communications device 104 further includes a user input device 116, such as, for example and without limitation, a keyboard, mouse, trackball, touchpad, or microphone.

Electronic communications device 104 is controlled by software, which may include network communication and browser software to allow a user to request, receive and display information from or through gaming server 102 via communications network 106.

User Registration and Team Formation

Figure 2:
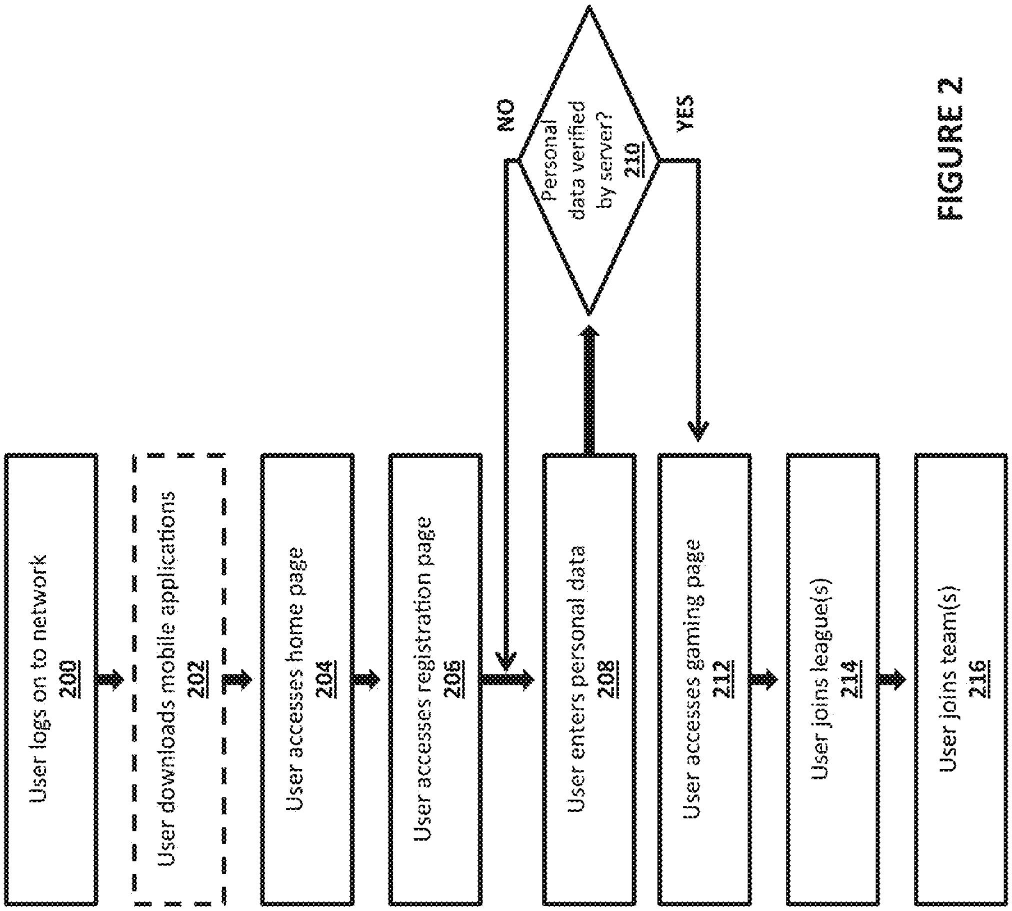
FIG. 2 is a flowchart illustrating an exemplary user registration method.

With reference to FIG. 2, a flowchart illustrates an exemplary user registration method. According to the FIG. 2 flowchart, a user who desires to participate in a league establishes a connection in step 200 on a wide area computer network between an electronic communications device 104 (see FIG. 1) and a gaming server 102.

Referring again to FIG. 2, a user may optionally download a mobile application to an electronic communications device at step 202.

Once a user has established a connection with gaming server 102 (FIG. 1), the player accesses home page in step 204 (FIG. 2). At step 206, the user accesses a sign-up page via a link from the home page. Once a user has accessed the sign-up page, the user is prompted to enter personal information at step 208. Personal information may include, for example, name, address, date of birth, user name, password, and method of payment information. At step 210, the personal information is conveyed to and verified by gaming server 102 (FIG. 1). If the information is accepted, gaming server 102 allows the user to access a gaming page in step 212.

Figure 3:
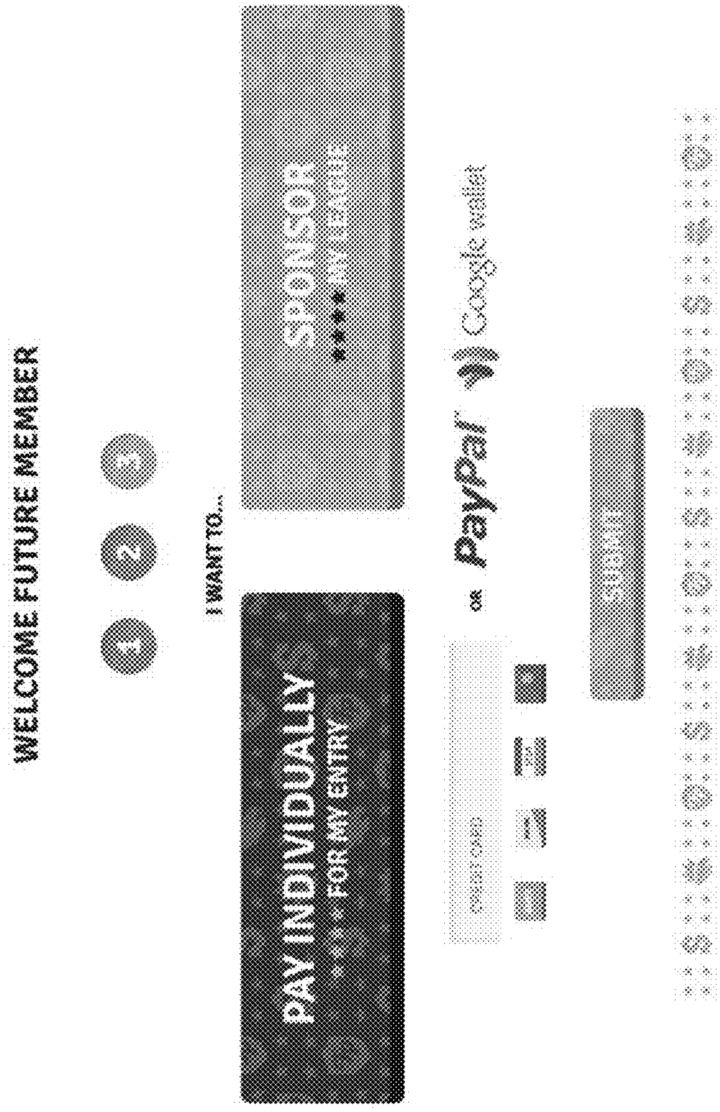
FIG. 3 illustrates a graphical user interface on a display showing an exemplary payment option screen.

Once connected to the gaming page, the user may create or join one or more leagues at step 214. The leagues may be chosen from, for example, a drop-down list or other selectable list format. Each league may have an unlimited number of users. In a preferred embodiment, each league has a minimum of 4 users and a maximum of 200 users. A league may be formed at the start of a regular season of a particular sport, during the season, or in the post-season. The creator of a league may be designated the "league commissioner." The league commissioner may elect a payment option for teams participating in the league. The league commissioner may select, for example, a "Pay Individually" option, in which all league teams will pay their own fees. Alternatively, the league commissioner may select a "Sponsor" option, where a participant pays for another participant's fees. FIG. 3 illustrates a graphical user interface on a display showing an exemplary payment option screen.

Leagues may be public or private, based on the settings chosen by the league commissioner. Any user around the world may join a public league for free. A private league is open to invited users only. Joining a private league may require a unique password. However, private leagues allow access to additional features, such as Powerups (described in more detail below). Joining leagues may be free or may require payment of a fee to the game administrator.

For each league the user joins, the user may then create a team or join an existing team at step 216. An existing team may be chosen from, for example, a drop-down list or other selectable list format. Each team comprises one or more users and has at least one manager that makes decisions on behalf of the team. Multiple users may co-manage a single team from multiple user accounts, if desired. Each team has an associated balance, which may consist of points and/or currency.

The game of the present invention may be applied to any professional or collegiate sport, including but not limited to American football, soccer, basketball, baseball, golf, and hockey. The length of league play may be a week, a single game, a full season, a post-season period, or any other time period determined by the game administrator or league commissioner.

Basic Game Play

The number of selections that each team may make for a particular time period is determined by the league commissioner. Each selection is associated with a gaming event, for which there is an associated adjusted spread value. Any number combinations of these three variables (number of selections, adjusted spread, and time period) may be used. In a preferred embodiment, there are four selections per team per week and the adjusted spread value is two scores. The adjusted spread value could be expressed in other ways, such as a percentage of the spread or a multiple of the spread. The following preferred embodiment assumes game play occurring during a regular sports season, but game play during a post-season period would work in substantially the same manner.

In the preferred embodiment, each team must make four selections each week using the adjusted spread values. Each team may make weekly selections independently and confidentially from one another. In other embodiments, teams may make selections publicly. In the preferred embodiment, the adjusted spread values are increased with two scores (+14 points) for each selection. For example, if Denver (DEN) is playing Seattle (SEA), and DEN is favored by 6 points, the regular spread would be: DEN −6 and SEA +6. In the preferred embodiment, the adjusted spread would be DEN +8 and SEA +20. The calculation of the adjusted spread is shown below:

Team DEN+8(−6+14=+8)

Team SEA+20(+6+14=+20)

A team manager may want to choose the following selections for a given week:

CHI +3
HOU −16
GB −14
DET −7.5

Using the adjusted spread of the preferred embodiment, the selections would be displayed as:

CHI +17
HOU −2
GB +0 (even)
DET +6.5

Figure 4:
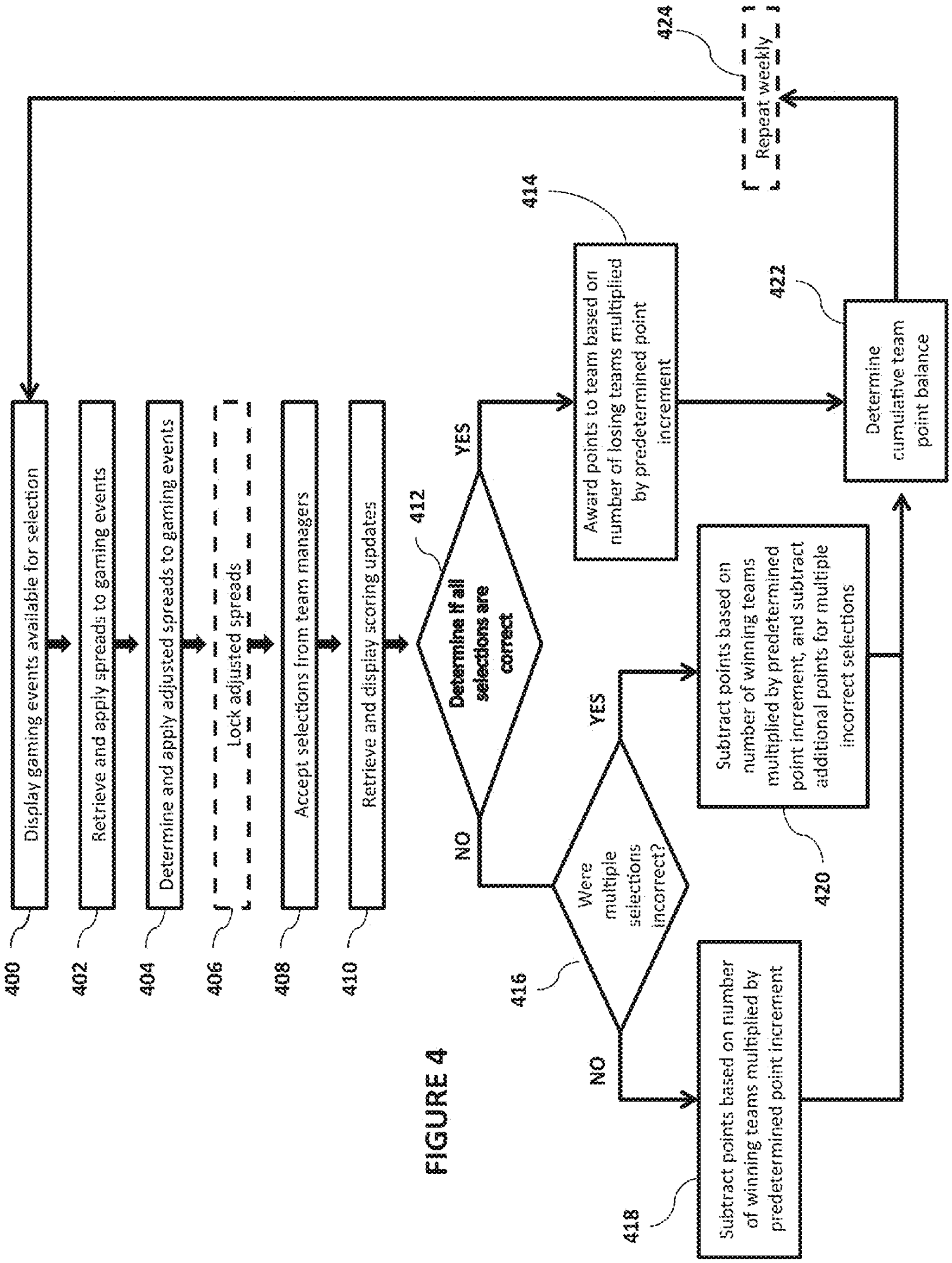
FIG. 4 is a flowchart illustrating an exemplary game play method.

Referring now to FIG. 4, a flowchart illustrates an exemplary game play method using the predetermined number of selections and adjusted spread of the preferred embodiment.

At step 400, the gaming events available for selection for the week are displayed on the web page for the users. At step 402, the spreads are displayed for each of the available gaming events. At step 404, the adjusted spread for each available gaming event is determined and displayed. At optional step 406, the adjusted spreads may be locked at a predetermined date and time, which may be communicated to the users (for example, a message may be displayed on the web page: "Weekly Spreads are posted each Wednesday at Noon (EST).").

At step 408, the user (the team manager) makes four selections of the available gaming events for the week. The user may use the adjusted spreads to decide which teams he thinks will be winners during the week. The selection window, the time period during which the selections must be made, will be displayed on the web page so the user knows when he is allowed to make his selections (for example, a message may be displayed on the web page: "Thursday Night Game Picks are Due by 5 μm. (EST) on Thursday. All Other Picks Due by Saturday at Noon (EST).").

At step 410, live updates regarding the scores of the gaming events are retrieved and displayed on the web page. Updates may also be communicated to users via other methods, such as by push notifications on smart phones or tablets. Referring back to FIG. 1, gaming server 102 accesses information about the gaming events the external data storage device 112 and information on the outcome of game-based sporting events either from this device or from one or more sports wire services, such as Application Programming Interfaces (APIs). The API connectivity allows the gaming server 102 to pull betting odds from reputable sources. The APIs further retrieve scores for professional and college-level sporting events in real-time, allowing gaming server 102 to organize and output the data for display to the users on the electronic communications device 104.

Game Payout

Referring again to FIG. 4, at step 412, the number of winning selections by the user is determined by comparing the user's selections with the scoring data for the gaming events. If all four of a user's selections are correct, the team is a winning team for the week. At step 414, the winning team is awarded points based on the total number of losing teams for the week, multiplied by a point increment that has been predetermined by the game administrator.

If any one of the user's four selections is incorrect, the team is a losing team for the week. At the option of the game administrator or league commissioner, a tie (or "push" with the adjusted spread) may be counted as an incorrect selection. At step 416, the system determines whether more than one of the user's selections is incorrect. If only one of the user's selections is incorrect, at step 418, points are deducted based on the total number of winning teams, multiplied by a point increment that has been predetermined by the league commissioner. If more than one of the user's selections is incorrect, at step 420, points are deducted based on the total number of winning teams, multiplied by a point increment that has been predetermined by the league commissioner, and additional points are deducted based on the number of incorrect selections.

In any given week (or other time period determined by the league commissioner), if there are no losing teams (all winning teams) or no winning teams (all losing teams), then a different scoring mechanism may be applied. An "FP Score" for each team in the league may be calculated. The "FP Score" measures the total quality of each team's selections. The teams with the top 50% of the FP Scores will be considered winning teams. The teams with the bottom 50% of the FP Scores will be considered losing teams.

In an alternative embodiment, if there are no losing teams (all winning teams) or no winning teams (all losing teams) in the given time period, there may be "No Action" or "Carry Over". In the "No Action" variation, every team scores zero and there is no payout during the given time period for any team. In the "Carry Over" variation, the increment doubles for the subsequent time period. For instance, if the increment is set at $10 during week one and there are no winning teams or no losing teams, then the increment will be increased to $20 during week two only. In week three, the increment would return to the standard $10.

At step 422, the cumulative team balance is determined based on the awarding or deducting of points. It will be understood that "points" as used herein could include non-monetary points or currency.

At step 424, the method of game play is repeated on a weekly basis. In alternative embodiments, the method may not be repeated (as in the case of single-week leagues), or could be repeated weekly for only part of a sports season (partial-season leagues), or could be repeated every week for an entire sports season (full-season leagues, typically 17 weeks, or a full-season plus post-season league). Any other suitable time period could be used for a league (such as, for example, a Playoff league that runs only during a playoff period for a particular sport).

After the final week, a champion is determined based on the teams' cumulative balances.

Examples of Game Play

An example of the method of FIG. 4 is described herein, using an American football league. FIG. 5A shows a listing of all gaming events, one of which is labeled 500, available for a particular week. This listing will be reviewed by the teams before making their selections. The listing also shows the spread 502 and the adjusted spread 504 associated with each gaming event. FIG. 5B shows a listing of the selections of each team in the league, chosen by the team managers from the listing of FIG. 5A. In this example, each team 506 was allowed four selections 508 for the week. FIG. 5C shows a listing of the results of the selections of each team in the league. The losing selections are highlighted, one of which is labeled 510. The final result is also shown, and includes WINNER 512, LOSER 514, DOUBLE LOSER 516, TRIPLE LOSER 518, and QUADRUPLE LOSER (not shown). FIG. 5D shows a listing of the calculated balances for each team 520. The payouts after the weekly results are shown in the first column 522. The cumulative balances, or "Standings," are shown in the second column 524.

In an alternative example, an adjusted spread calculation and total points calculation for a single team's weekly selections is illustrated in FIG. 6. In this example, the team chose the following selections: DEN, Pick 1 (600), CHI, Pick 2 (602), IND, Pick 3 (604), and WAS, Pick 4 (606). All selections were correct selections. The final scores of the events are listed, one of which is labeled 608. The spread 610 for each event is also listed. Points 612 are added according to the predetermined spread adjustment value. The adjusted spread 614 is calculated by adding points 612 to the spread 610. The adjusted spread 614 is added to the final score 608, and the opponent's score 616 is subtracted, to determine the total score for the events, known as FP Points 618. The FP Points 618 for each selection is calculated, and a total 620 is calculated for the week, which is the amount that is multiplied by the predetermined point increment and added to the team's balance.

Powerups

As users are playing directly against the other users in their league(s) as opposed to against a bookie or the house, this game includes a strategic element. For each user, the ideal outcome is to be on a winning team for the time period. The fewer the winning teams, the higher the payout for the winning teams. As a result, it is important that users maintain some secrecy in their selection process.

Users may acquire or purchase "Powerups," which each confer a potential competitive advantage to users who own them. The following are examples of Powerups that may be acquired or purchased by users and are intended as illustrative and not limiting.

Pick Revealer:

Before making its selections, a team can reveal another targeted team's selection(s). For instance, Team A may acquire a single Pick Revealer to review one of Team B's selections. Team A may acquire as many of these Powerups as desired to see all of Team B's (and/or Team C's, and/or Team D's, etc.) selections. The team who acquires this Powerup may use it only when the target team has already made its selections.

Pick Percentage:

Before making its selections, a team can choose one or more "selection" (e.g., one team playing in a sporting event) from the available selections and display the percentage of users that made that selection out of all selections that have been made by all teams. These percentages will only display the submitted selections at the time the Powerup is executed, and as such, it may be beneficial to use this Powerup as close as possible to the end of the selection window. Teams may buy multiples of this Powerup to see percentages associated with more than one selection. Alternatively, teams may purchase subscriptions to see percentages of one or more selections throughout the league play period.

Spread the Spread:

A team may be more confident about certain selections over others. This Powerup allows the team to move some of the adjusted spread points between their selections. For instance, suppose a team made following selections: CHI +17, HOU −2, GB +0 (even), DET +6.5. However, the team is very confident that CHI will beat the spread, but less certain that GB will beat the spread. This Powerup would allow one point from the CHI spread to be moved to the GB spread. The resulting spreads would be: CHI +16, HOU −2, GB +1, DET +6.5, thus giving the team better odds for the GB selection.

The Leveler (I):

If a team has been a losing team for more than a certain number of weeks consecutively, this Powerup will become available to the team. If implemented, the team can "black out" a particular game from the league's first place team (or all first place teams, if there are multiple teams tied for first place), such that the team(s) could not select the game as one of its allotted selections. All other teams in the league would still be able to select the game.

The Leveler (2):

If a team has been a losing team for more than a certain number of weeks consecutively, this Powerup will become available to the team. If implemented, the team can "black out" a particular game from all other teams in a league, except the team using the Powerup, such that no other team is able to select the game as one of its allotted selections.

Ask the Gurus:

A team can pay for the advice of a Guru, who will provide recommended selection combinations for the week. Each Guru's advice price may vary based on the Guru's record. As an added function, the selections may automatically generate in the team's selection box, if chosen by the team.

Late Picker:

Should a team fail to make its allotted selections prior to the closing of the selection window, normally the team may be an automatic loser for the week or may receive an "underdog" lineup. That is, the events least likely to result in a winning outcome (based on the adjusted spreads) will automatically be chosen for the team. However, utilizing this Powerup will randomly select four new selections for the team.

Value Finder:

The adjusted spreads for a league may be locked when they are released for display to the users (see FIG. 3, step 306). However, in reality, spreads fluctuate each day. To save time, a team can use this Powerup to quickly display how the spread for each gaming event has moved since it was locked. The team may find this information useful in making their selections.

The Degenerate:

After a team makes an incorrect selection, it may exercise this advanced feature to make one additional selection from the remaining available gaming events. Depending on the league commissioner's settings for the league, the team may be required to risk additional points to take advantage of this feature.

Team Behavior Reporting:

Selection behaviors of each team participating in a league will be recorded and may be displayed to other league teams to show tendencies and biases. This information may be used by other teams in developing their own selection strategies. Examples of behaviors by league teams include, for example and not by way of limitation, biases towards favorites, underdogs, home athletes or athletic teams, away athletes or athletic teams, athletes or athletic teams from particular cities, athletes or athletic teams from particular conferences, and athletes or athletic teams from particular divisions.

Adjusted Spread Specific Reporting:

Statistical analysis of adjusted spread specific reporting on athletic teams will be recorded and displayed to show tendencies and biases. This information may be used by participating league teams in developing their own selection strategies. Examples of behaviors include, for example and not by way of limitation, how an athletic team plays at home when the designated adjusted spread, how an athletic team plays on the road with the designated adjusted spread, how an athletic team plays in different weather conditions with an adjusted spread, and how an athletic team plays in the post-season with an adjusted spread.

Additional Game Features

Multiple Incorrect Selections: A penalty pot is created for teams who have a certain number of incorrect selections in a single week. Losing teams may be required to contribute to the penalty pot by a predetermined increment or multiple of the increment, which may be chosen by the league commissioner. For example and not by way of limitation, an increment of $10 may be chosen by the league commissioner with the following multiples: Double Loser (×1), Triple Loser (×2), Quadruple Loser (×3). In this scenario, a Double Loser would contribute $10 to the penalty pot, a Triple Loser would contribute $20, and a Quadruple Loser would contribute $30. Alternatively, the league commissioner may determine a flat contribution amount across the board (e.g., all losers pay the same amount, such as $10) or differing flat amounts for each tier (e.g., Double Losers pay $10, Triple Losers pay $30, Quadruple Losers pay $50). Many variations of the penalty pot calculation are possible.

Make a Donation Penalty:

As an optional feature, the league commissioner may implement a penalty whereby a losing team that has made 2 ("Double Loser"), 3 ("Triple Loser"), 4 ("Quadruple Loser"), or some other predetermined number of incorrect selections in a single week must donate a minimum amount to a designated charity.

Figure 8:
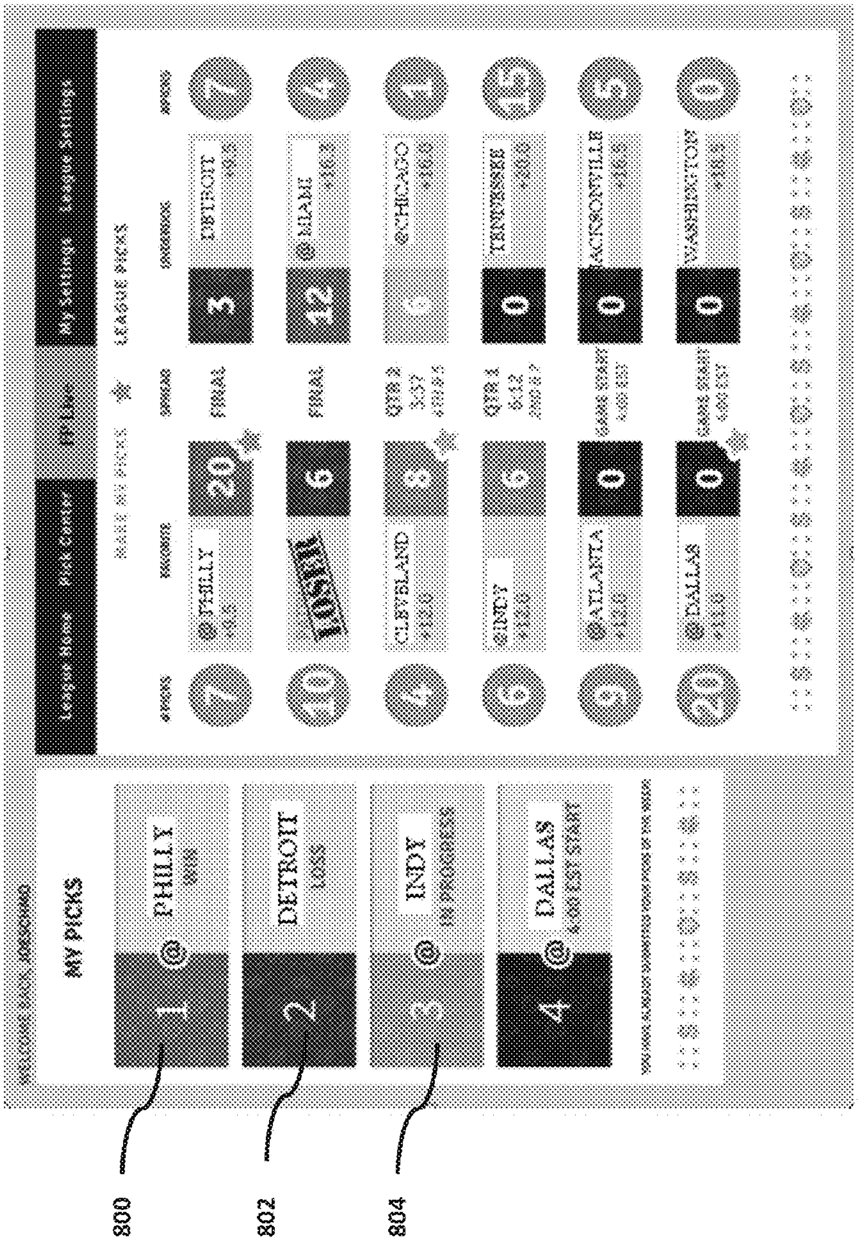
FIG. 8 illustrates an exemplary graphical user interface on a display showing use of a Sporting Event Dynamic Visual Aid on a team's selections.

Sporting Event Dynamic Visual Aid for Spreads and Adjusted Spreads: A unique meter is displayed on the gaming page that acts as a dynamic visual aid based on a selection's performance, which is updated in real time. As the game progresses, the visual aid will change based on how the particular selection is performing. FIG. 7 illustrates an exemplary formula for calculating the Sporting Event Dynamic Visual Aid for spreads and adjusted spreads. FIG. 8 shows an exemplary graphical user interface on a display illustrating the use of the Sporting Event Dynamic Visual Aid on a team's selections, where different shading represents different colors for wins 800, losses 802, and pending games 804, allowing the user to see quickly and easily how the team is performing in the weekly competition. Colors, symbols, or any other visual cue may be used to illustrate performance in the Sporting Event Dynamic Visual Aid.

The Straddle:

In traditional gaming, it is possible to bet on both teams competing in a single gaming event. However, it is impossible to win both of the bets, since once team will win and one team will lose. Due to the nature of the adjusted spread of the present invention, it is possible that a team can select both teams competing in a single gaming event and that both of those selections will be correct, or "winning," selections.

Figure 9:
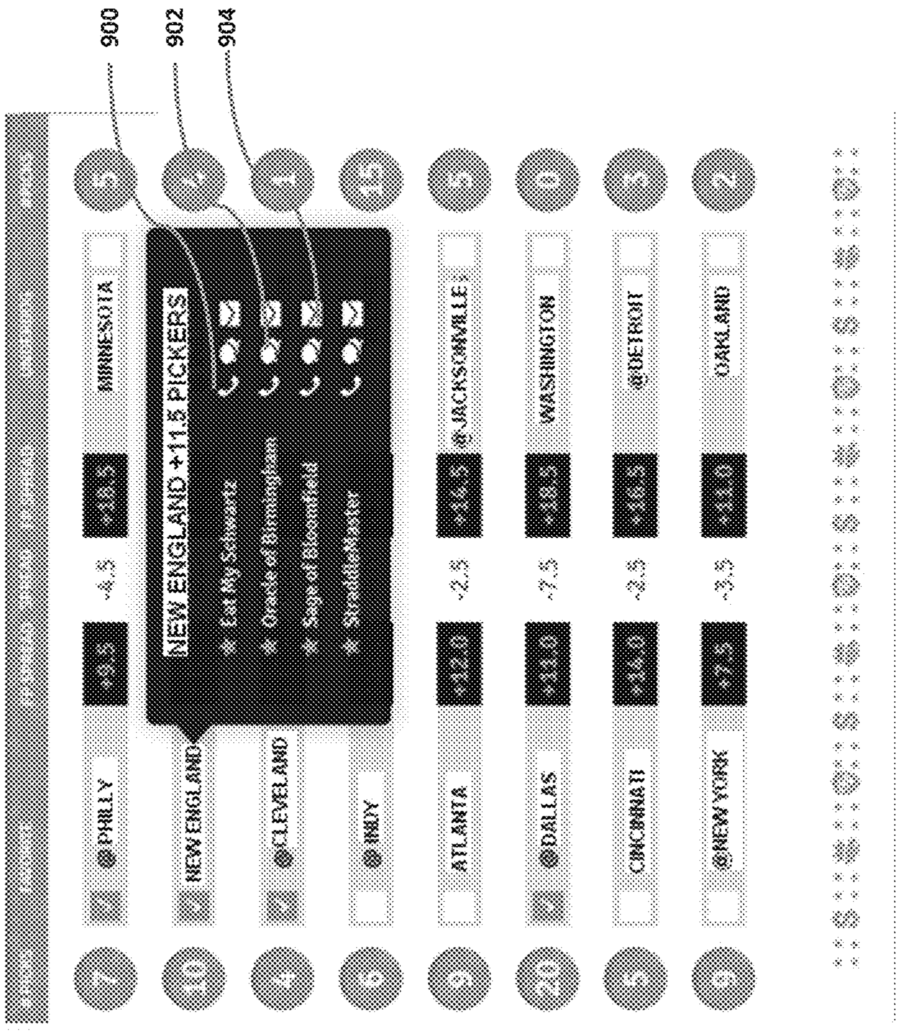
FIG. 9 illustrates an exemplary display of an electronic communications device showing options available to users for social interaction.

Social Hub:

The present invention may include a Social Hub, where users may communicate with one another, purchase Powerups, and purchase apparel or other merchandise. When registering for league play, users may be required to enter a telephone number and/or an email address (see FIG. 2, step 208). Users may utilize a tool from the website and/or mobile application that allows communication between players of the same or different teams via e-mail, text/SMS, or telephone. This feature also extends into any other third-party communication platform including but not limited to any internet-based site used as a medium of communication between individuals. FIG. 9 illustrates an exemplary display of an electronic communications device showing options available to users for social interaction, such as talk 900, text 902, and e-mail 904 icons.

Additional Game Day Information:

Additional information may be displayed to teams that may be helpful in making selections, including, for example, weather information, player injury reports, spread information, and game location.

Number of Pickers:

When the selection window has closed, all teams will have either made their selections, or selections will have been automatically assigned. Immediate following the selection window closing, teams may view each other's selections. Certain statistics, such as the number of teams that made certain selections, may also be viewable.

Automatic Pick Email System:

At times, an automated mail system may send e-mail messages to all users or a subset of users based on custom settings of the league commissioner or the game administrator. Example message topics may include, but are not limited to, spreads, selections, and results/payouts.

Late Picker Settings:

The league commissioner may decide that a team that miss the selection window is automatically a losing team. The team may be given an option to pay a nominal fee (e.g., \$1-\$5) to generate selections and thus have a second chance at being a winning team (e.g., "underdog" lineup based on adjusted spread, "underdog" lineup based on team records, random selection generator, etc.).

Loser Alerts:

An automated mail system may send e-mail messages to all users or a subset of users when a team is about to become a Double Loser, Triple Loser, Quadruple Loser, or other losing team based on multiple losing selections, as determined by the league settings.

The Prize Pool:

Additional points may be awarded to the top finishing teams at the end of a season. Additional points may be awarded to the top finishing teams at the quarter-point or mid-point of a season. The prize pool is calculated by deducting a predetermined amount from all teams, which is then awarded to the prize pool winner or winners. Users may join multiple leagues under the same user account, and the sum of the user's overall standings in each league may be calculated for prizes and/or other rewards.

Post-Season Leagues

Teams may have the option to participate in a bonus playoff after the end of a regular season. Game play during post-season periods works in substantially the same manner as described in the foregoing examples. The scoring of the post-season leagues may be separate from the scoring rules of the regular season (e.g., the standings are cleared and re-start with the post-season league). For instance, in the case of American football, the post-season playoff league would take place during the three professional football playoff weekends and the professional football championship, for a total of 4 weeks.

Depending on the number of gaming events available during the post-season league, the predetermined number of selections may be increased or decreased (e.g., only 3 selections are required instead of the standard 4 required during the regular season). Moreover, the spread may be adjusted differently during the post-season league (e.g., the spread may be adjusted by 10 points instead of the standard 14 points during the regular season).

FIG. 10A illustrates the gaming events available for selection in an exemplary week of a post-season league. Each available gaming event 1000 is displayed with an associated spread 1010 and item number 1020.

FIG. 10B illustrates an alternative listing of gaming events available for selection in a week of a post-season league. Each available gaming event 1030 is displayed with an associated spread 1040 and item number 1050. Rather than each gaming event being associated with a team (which may be a winner or a loser), here the gaming events include other types of events, including total points scored during a game, half-time scores, quarterly scores, and other similar events.

Notification Schedules

Notification schedules may assist league commissioners and/or game administrators with the communication of timing of selections and the posting of results to a league's teams. FIG. 11A illustrates an exemplary notification schedule for a league that follows a professional sports league (e.g., the NFL, NBA, or the like). FIG. 11B illustrates an exemplary notification schedule for a league that follows a collegiate sports league (e.g., the NCAA or the like).

User Profiles

Figure 12:
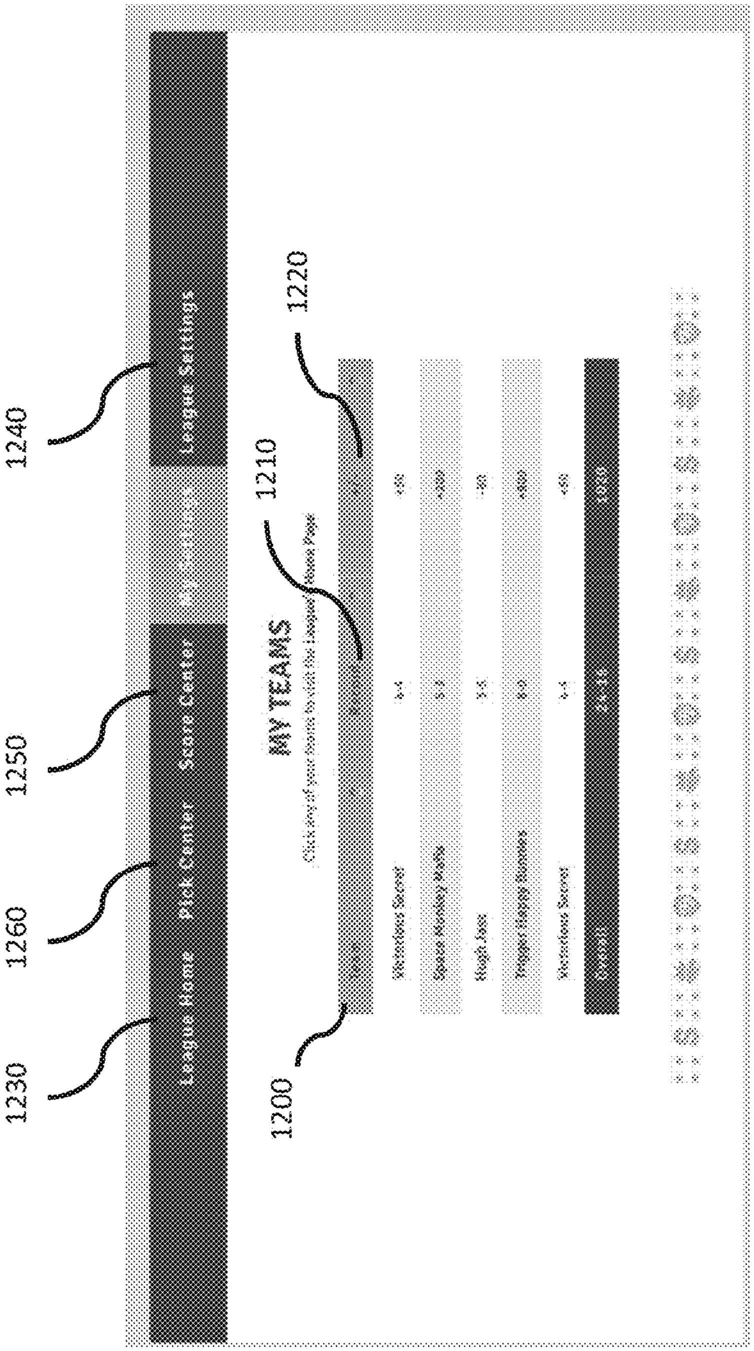
FIG. 12 illustrates a graphical user interface on a display showing an exemplary user profile.

Each user that registers for a league may have a customizable user profile. FIG. 12 illustrates a graphical user interface on a display showing an exemplary user profile. A listing of the teams and/or leagues that the user has joined may be displayed 1200, along with team information, such as the team's record 1210 and balance information 1220. Other information may be accessible from this page, including the league home page 1230, league settings 1240, scoring information 1250, and a "Pick Center" 1260 where selections for each team may be researched and entered.

Figure 13:
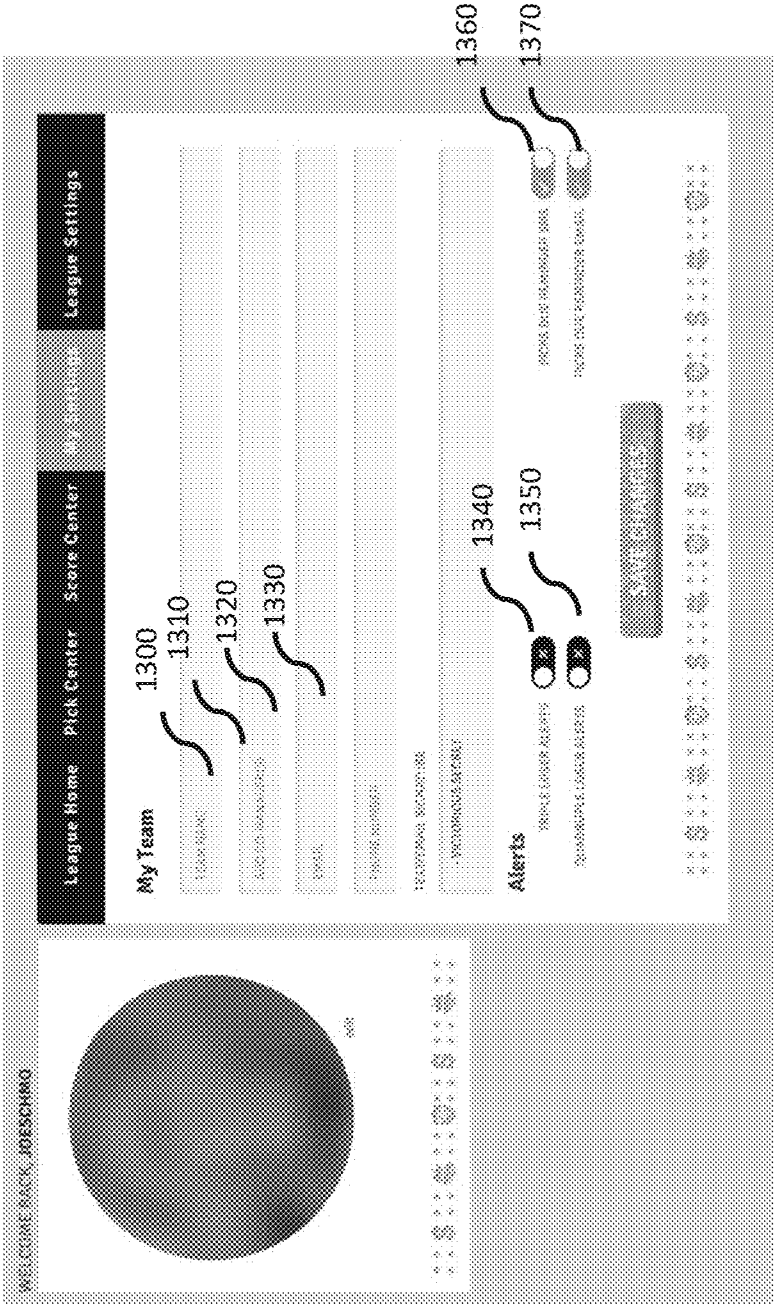
FIG. 13 illustrates a graphical user interface on a display showing an exemplary team web page.

The individual team web pages may be accessible via links from the user's profile. FIG. 13 illustrates a graphical user interface on a display showing an exemplary team web page. Information about the team, including, for example, the team name 1300, manager or co-manager names 1310, a primary e-mail address 1320 and telephone number 1330, may be displayed. Moreover, the user may choose which alerts or messages to receive regarding the team updates, including, for instance, Triple Loser alerts 1340, Quadruple Loser alerts 1350, and a reminder when selections are due via SMS 1360 or e-mail 1370. Alerts may be sent for other reasons, including, for instance, alerts regarding a losing team based on a different number of multiple losing selections (e.g., Double Loser Quintuple Loser, etc.), as determined by the league settings.

What is claimed is:

1. A system for providing a game to a user via a computing device, comprising:

a database including information associated with a plurality of live sporting events;

a user module communicatively coupled to the database and being configured to receive information associated with the plurality of live sporting events; and a gaming server communicatively coupled to the database and the computing device, the gaming server configured to:

display a list of at least two live sporting events on the user module, wherein the at least two live sporting events occur in the future, receive within a particular time period a selection from a team of at least two event outcomes, the team comprising at least one individual user, receive event outcome information from the database, display event outcome information on the user module, determine whether each of the at least two selected event outcomes occurred during the time period, determine whether the team is a winning team or a losing team based on the at least two selected event outcomes, determine that the team is a winning team when all of the at least two selected event outcomes occurred during the time period, determine that the team is a losing team when fewer than all of the at least two selected event outcomes occurred during the time period, award a winning team a predetermined number of winning points to a balance associated with the team, wherein the predetermined number of winning points is calculated based on the number of losing teams of the plurality of teams multiplied by a predetermined multiplier, and deduct from the balance of a losing team a predetermined number of losing points, wherein the predetermined number of losing points is calculated based on the number of winning teams of the plurality of teams multiplied by a predetermined multiplier, and further deduct one or more additional points from the balance when more than one of the at least two selected event outcomes did not occur during the time period, and wherein the losing team is allowed to continue to play the game.

2. The system of claim 1, wherein the gaming server is further configured to display the results of the at least two selected event outcomes on the user module.

3. The system of claim 1, wherein the gaming server is further configured to:

receive a predetermined spread adjustment value, retrieve a spread for each of the at least two live sporting events from the database, and apply the spread adjustment value to the spread to produce an adjusted spread for each of the at least two live sporting events.

4. The system of claim 3, wherein the gaming server is further configured to lock the adjusted spread at a predetermined date and time, wherein the predetermined date and time is before the at least two live sporting events begin.

5. The system of claim 3, wherein the predetermined spread adjustment value is a number of points.

6. The system of claim 1, wherein the gaming server receives within the particular time period a selection from each of two or more teams.

7. The system of claim 6, wherein the gaming server is further configured to:

determine that none of the two or more teams is a winning team.

8. The system of claim 7, wherein the gaming server is further configured to:

apply a quality score to each of the two or more teams, and determine that at least one team of the two or more teams is a winning team based on the quality score.

9. A system for providing a game to a user via a computing device, comprising:

a database including information associated with a plurality of live sporting events;

a user module communicatively coupled to the database and being configured to receive information associated with the plurality of live sporting events; and a gaming server communicatively coupled to the database and the computing device, the gaming server configured to:

display a list of at least two live sporting events on the user module, wherein the at least two live sporting events occur in the future, receive a predetermined spread adjustment value from a game administrator, retrieve a spread for each of the at least two live sporting events from the database, apply the spread adjustment value to the spread to produce an adjusted spread for each of the at least two live sporting events, receive within a particular time period a selection from a team of at least two event outcomes, the team comprising at least one individual user, receive event outcome information from the database, display event outcome information on the computing device, determine whether each of the at least two selected event outcomes occurred during the time period, determine whether the team is a winning team or a losing team based on the at least two selected event outcomes, determine that the team is a winning team when all of the at least two selected event outcomes occurred during the time period, determine that the team is a losing team when fewer than all of the at least two selected event outcomes occurred during the time period, award a winning team a predetermined number of winning points to a balance associated with the team, wherein the predetermined number of winning points is calculated based on the number of losing teams of the plurality of teams multiplied by a predetermined multiplier, and deduct from the balance of a losing team a predetermined number of losing points, wherein the predetermined number of losing points is calculated based on the number of winning teams of the plurality of teams multiplied by a predetermined multiplier, and further deduct one or more additional points from the balance when more than one of the at least two selected event outcomes did not occur during the time period, and wherein the losing team is allowed to continue to play the game.

10. The system of claim 9, the gaming server further configured to display the results of the at least two selected event outcomes on the user module.

11. The system of claim 9, wherein the gaming server is further configured to lock the adjusted spread at a predetermined date and time, wherein the predetermined date and time is before the at least two live sporting events begin.

12. The system of claim 9, wherein the predetermined spread adjustment value is a number of points.

13. The method of claim 9, wherein the predetermined spread adjustment value is a percentage of the spread.

14. The system of claim 9, wherein the gaming server receives within the particular time period a selection from each of two or more teams.

15. The system of claim 14, wherein the gaming server is further configured to:

determine that none of the two or more teams is a winning team.

16. The system of claim 15, wherein the gaming server is further configured to:

apply a quality score to each of the two or more teams, and determine that at least one team of the two or more teams is a winning team based on the quality score.

17. A method for providing a game to a user via a computing device, comprising:

storing, in a database, information associated with a plurality of live sporting events;

receiving, via a user module communicatively coupled to the database, information associated with the plurality of live sporting events;

displaying, by a gaming server communicatively coupled to the database and the computing device, a list of at least two live sporting events on the user module, wherein the at least two live sporting events occur in the future;

receiving, by the gaming server, within a particular time period a selection from a team of at least two event outcomes, the team comprising at least one individual user;

receiving, by the gaming server, event outcome information from the database;

displaying, by the gaming server, event outcome information on the user module;

determining, by the gaming server, whether each of the at least two selected event outcomes occurred during the time period;

determining, by the gaming server, whether the team is a winning team or a losing team based on the at least two selected event outcomes;

determining, by the gaming server, that the team is a winning team when all of the at least two selected event outcomes occurred during the time period;

determining, by the gaming server, that the team is a losing team when fewer than all of the at least two selected event outcomes occurred during the time period;

awarding, by the gaming server, a winning team a predetermined number of winning points to a balance associated with the team, wherein the predetermined number of winning points is calculated based on the number of losing teams of the plurality of teams multiplied by a predetermined multiplier; and deducting, by the gaming server, from the balance of a losing team a predetermined number of losing points, wherein the predetermined number of losing points is calculated based on the number of winning teams of the plurality of teams multiplied by a predetermined multiplier, and further deduct one or more additional points from the balance when more than one of the at least two selected event outcomes did not occur during the time period, and wherein the losing team is allowed to continue to play the game.

18. The method of claim 17, the method further comprising:

displaying, by the gaming server, the results of the at least two selected event outcomes on the user module.

19. The method of claim 17, the method further comprising:

receiving, by the gaming server, a predetermined spread adjustment value, retrieving, by the gaming server, a spread for each of the at least two live sporting events from the database, and applying, by the gaming server, the spread adjustment value to the spread to produce an adjusted spread for each of the at least two live sporting events.

20. The method of claim 19, the method further comprising:

locking, by the gaming server, the adjusted spread at a predetermined date and time, wherein the predetermined date and time is before the at least two live sporting events begin.

21. The method of claim 19, wherein the predetermined spread adjustment value is a number of points.

22. The method of claim 21, wherein the predetermined spread adjustment value is a number of points.

23. The method of claim 21, wherein the predetermined spread adjustment value is a percentage of the spread.

24. The method of claim 17, wherein the gaming server receives within the particular time period a selection from each of two or more teams.

25. The method of claim 24, wherein the gaming server is further configured to:

determine that none of the two or more teams is a winning team.

26. The method of claim 25, wherein the gaming server is further configured to:

apply a quality score to each of the two or more teams, and determine that at least one team of the two or more teams is a winning team based on the quality score.

27. A method for providing a game to a user via a computing device, comprising:

storing, in a database, information associated with a plurality of live sporting events;

receiving, via a user module communicatively coupled to the database, information associated with the plurality of live sporting events;

displaying, by a gaming server communicatively coupled to the database and the computing device, a list of at least two live sporting events on the user module, wherein the at least two live sporting events occur in the future;

receiving, by the gaming server, a predetermined spread adjustment value from a game administrator, retrieving, by the gaming server, a spread for each of the at least two live sporting events from the database;

applying, by the gaming server, the spread adjustment value to the spread to produce an adjusted spread for each of the at least two live sporting events;

receiving, by the gaming server, within a particular time period a selection from a team of at least two event outcomes, the team comprising at least one individual user;

receiving, by the gaming server, event outcome information from the database;

displaying, by the gaming server, event outcome information on the computing device;

determining, by the gaming server, whether each of the at least two selected event outcomes occurred during the time period;

determining, by the gaming server, whether the team is a winning team or a losing team based on the at least two selected event outcomes;

determining, by the gaming server, that the team is a winning team when all of the at least two selected event outcomes occurred during the time period;

determining, by the gaming server, that the team is a losing team when fewer than all of the at least two selected event outcomes occurred during the time period;

awarding, by the gaming server, a winning team a predetermined number of winning points to a balance associated with the team wherein the predetermined number of winning points is calculated based on the number of losing teams of the plurality of teams multiplied by a predetermined multiplier; and deducting, by the gaming server, from the balance of a losing team a predetermined number of losing points, wherein the predetermined number of losing points is calculated based on the number of winning teams of the plurality of teams multiplied by a predetermined multiplier, and further deduct one or more additional points from the balance when more than one of the at least two selected event outcomes did not occur during the time period, and wherein the losing team is allowed to continue to play the game.

28. The method of claim 27, the method further comprising:

displaying, by the gaming server, the results of the at least two selected event outcomes on the user module.

29. The method of claim 27, the method further comprising:

locking, by the gaming server, the adjusted spread at a predetermined date and time, wherein the predetermined date and time is before the at least two live sporting events begin.

30. The method of claim 27, wherein the gaming server receives within the particular time period a selection from each of two or more teams, and wherein the gaming server is further configured to:

determine that none of the two or more teams is a winning team, apply a quality score to each of the two or more teams, and determine that at least one team of the two or more teams is a winning team based on the quality score.

* * * * *